(12) United States Patent
Zoller et al.

(10) Patent No.: US 7,317,574 B2
(45) Date of Patent: Jan. 8, 2008

(54) LONG-DISTANCE QUANTUM COMMUNICATION

(75) Inventors: Peter Zoller, Innsbruck (AT); Luming Duan, Ann Arbor, MI (US); Ignacio Cirac, Garching (DE); Mikhail D. Lukin, Cambridge, MA (US)

(73) Assignee: Magiq Technologies, Inc., New York, NY (US)

( * ) Notice: Subject to any disclaimer, the term of this patent is extended or adjusted under 35 U.S.C. 154(b) by 564 days.

(21) Appl. No.: 10/500,203

(22) PCT Filed: May 20, 2002

(86) PCT No.: PCT/US02/15135

§ 371 (c)(1),
(2), (4) Date: Jun. 28, 2004

(87) PCT Pub. No.: WO03/101013

PCT Pub. Date: Dec. 4, 2003

(65) Prior Publication Data

US 2004/0264958 A1      Dec. 30, 2004

(51) Int. Cl.
*G02B 27/00* (2006.01)
(52) U.S. Cl. .................. 359/577; 372/69; 372/72; 372/89; 398/40; 398/158; 430/321
(58) Field of Classification Search ............... 372/69, 372/72, 89; 359/577; 398/40, 158
See application file for complete search history.

(56) References Cited

U.S. PATENT DOCUMENTS

| 5,243,649 A | 9/1993 | Franson |
| 5,339,182 A * | 8/1994 | Kimble et al. ............... 398/158 |
| 5,418,905 A | 5/1995 | Rarity |
| 6,630,290 B2 * | 10/2003 | Williams et al. ............ 430/321 |

OTHER PUBLICATIONS

Duan et al ("Quantum Communication between Atomic Ensembles Using Coherent Light", The American Physical Society, vol. 85, No. 26, Dec. 25, 2000).*

* cited by examiner

*Primary Examiner*—Minsun Oh Harvey
*Assistant Examiner*—Yuanda Zhang
(74) *Attorney, Agent, or Firm*—Opticus IP Law PLLC (57) ABSTRACT

Apparatus and methods for high fidelity quantum communication over long communication channels even in the presence of significant loss in the channels are disclosed. The invention employs laser manipulation of quantum correlated atomic ensembles using linear optic components, optical sources of low intensity pulses, beam splitters, and single-photon detectors requiring only moderate efficiencies. The invention provides fault-tolerant entanglement generation and connection, using a sequence of steps that each provide built-in entanglement purification and that are each resilient to the realistic noise. The invention relies upon collective excitation in atomic ensembles rather than single particle excitations in atomic ensembles so that communication efficiency scales polynomially with the total length of a communication channel.

20 Claims, 4 Drawing Sheets

LONG-DISTANCE QUANTUM COMMUNICATION

This application claims the benefit of priority under 35 U.S.C. § 365 of International Patent Application Serial No. PCT/US02/15135, filed on May 20, 2002, designating the United States of America.

BACKGROUND OF THE INVENTION

1. Field of the Invention

The invention relates to long-distance quantum communication systems and methods for entanglement-based quantum communication protocols, such as quantum teleportation and quantum cryptography.

2. Description of the Background

All current proposals for implementing quantum communication are based on photonic channels. The degree of entanglement generated between two distant quantum systems coupled by photonic channels decreases exponentially with the length of the connecting channel due to optical absorption and noise in the channel. This decrease represents a loss of "entanglement fidelity" in the communication system, which can be restored via "entanglement purification." Entanglement purification (referred to as simply "purification" in the literature) means regaining a high degree of entanglement. See, e.g., Bennett, C. H. et al., "Purification of noisy entanglement and faithful teleportation via noisy channels", Phys. Rev. Lett. 76, 722-725 (1991). The exponential decay of entanglement as a function of channel length requires an exponentially increasing number of partially entangled states to obtain one highly entangled state.

The concept of quantum repeaters has been proposed to overcome the difficulty associated with the exponential decay of entanglement. See, e.g., Briegel, H.-J., Duer, W., Cirac, J. I. & Zoller, P., "Quantum repeaters: The role of imperfect local operations in quantum communication", Phys. Rev. Lett. 81, 5932-5935 (1991). A quantum repeater using a cascaded entanglement purification protocol for a quantum communication system is proposed in the article by Knill, E., Laamme, R. & Zurek, W. H., entitled "Resilient quantum computation", Science 279, 342-345 (1998), and in the article by Preskill, J., entitled "Reliable quantum computers", Proc. R. Soc. Lond. A 454, 385-410 (1998). The proposed quantum repeater includes many short segments, with the length of each segment being comparable to a channel attenuation length. The proposed quantum repeater is used by first generating entanglement and purifying the entanglement for each segment. The purified entanglement is then extended by connecting two adjacent segments through entanglement swapping, and so on. Each entanglement swapping, however, decreases the overall entanglement, which therefore requires a large number of iterations for sufficient purification.

SUMMARY OF THE INVENTION

Implementing the long-distance quantum communication systems and methods of the present invention includes generating entanglement between distant quantum bits (qubits), storing them for sufficiently long time, and performing local collective operations on several of these qubits. Having quantum memory is essential for the system, since all purification protocols are probabilistic. When entanglement purification is performed for each segment of the channel, the quantum memory is used to keep the segment state if the purification succeeds, and to repeat the purification for only those segments where the previous attempt failed. Having quantum memory is important for the polynomial scaling of the communication efficiency because having no available memory means that the purifications for all the segments must succeed at the same time. Unfortunately, the probability of this happening decreases exponentially with the channel length. The requirement of quantum memory implies that local qubits are stored in atomic internal states instead of the photonic states, since it is difficult (to the point of impracticality) to store photons. If atoms are used as the local information carriers, it is difficult to implement quantum repeaters because of the technically challenging proposition of having to use strong coupling between atoms and photons with high-finesse cavities for atomic entanglement generation, purification, and swapping.

An example embodiment of an apparatus of the present invention includes a light source, two cells each containing an atomic ensemble with a Lambda level configuration (examples are alkali atoms such as Sodium, Rubidium and Cesium), two filters, two channels, a beam splitter and two single-photon photodetectors.

Physical systems that may be used for atomic ensembles of the invention include ensembles of atoms in similar potential energy traps, such as atoms in an ion trap, optical lattice position, or crystal lattice position, and which have collective excitations so that they may couple to photons, such as phonon excitations in solids. Preferably, these atomic systems have energy levels similar to the Lambda configuration such that their collective excitations can be coupled to flying qubits in the same matter as for alkali metal atoms. Additionally, ensembles of localized excitation states such as electron states in superlattice structures including quantum dot ensembles, and Bose-Einstein condensates, may be useful ensembles for implementing the invention, and are also included in the definition of "atomic ensemble" as the phrase is used herein.

Another embodiment of the invention comprises a source, four atomic ensembles, two beam splitters, four single-photon detectors (SPDs), and two interferers. Additional elements comprise a synchronizer and single count photo detectors control system. Four atomic ensembles form two pairs of entangled atomic ensembles. Another method uses a preferred embodiment of the apparatus modified to be efficiently used in the quantum communication protocols, such as quantum cryptography, and for Bell inequality detection.

Another embodiment of the invention comprises a source, six atomic ensembles, two beam splitters, and four single count photo detectors. Additional elements comprise a synchronizer and single count photo detectors control system. Six atomic ensembles form two pairs of entangled atomic ensembles and two pairs of atomic ensembles with collective atomic excitations. Another method uses a preferred embodiment of the apparatus modified for realization of the quantum teleportation of the atomic polarization state.

Figure 2:
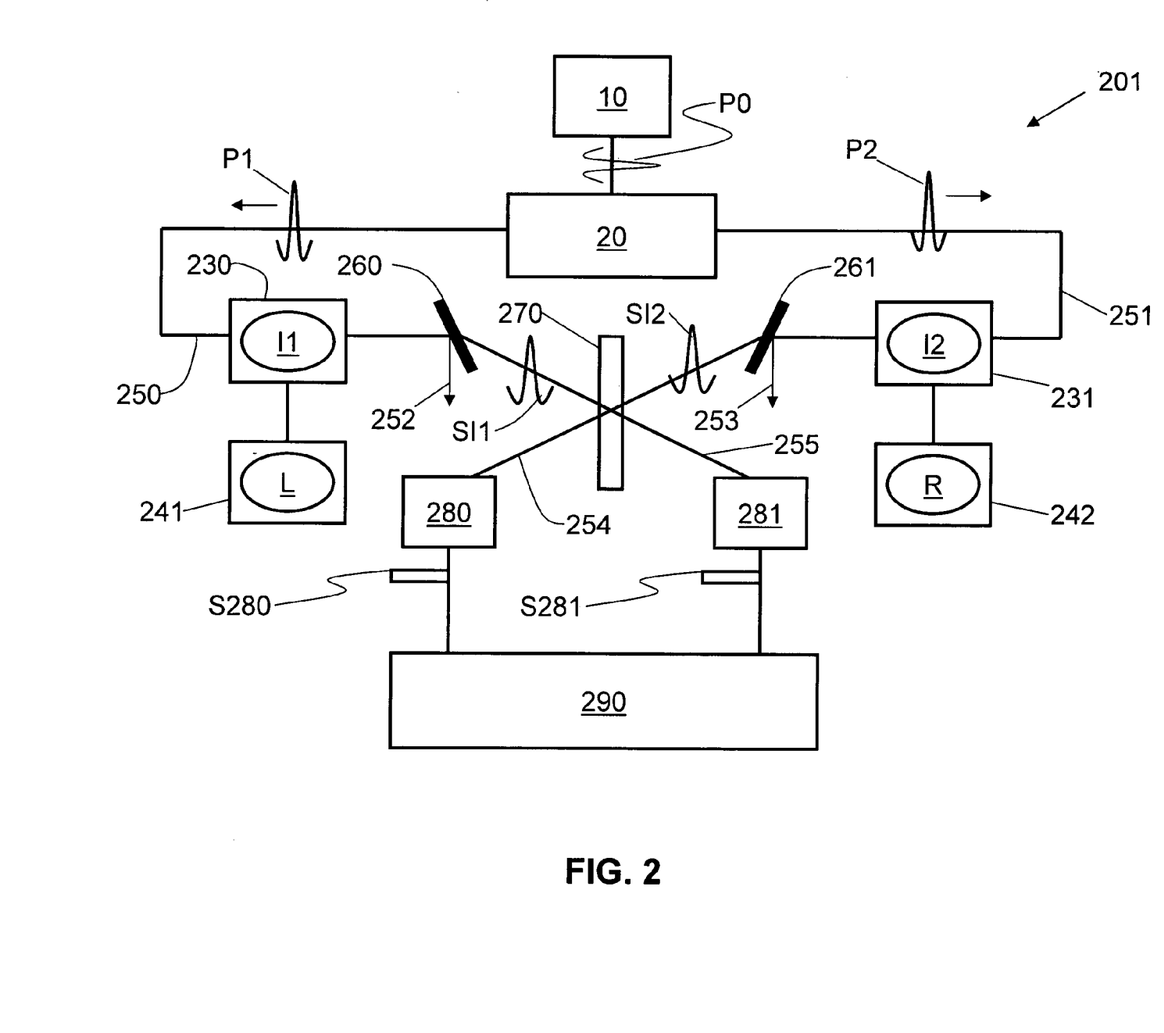
FIG. 2 is a schematic diagram of an example embodiment of an apparatus according to the present invention that employs two pairs of atomic ensembles for performing entanglement swapping.

The present invention relies upon collective rather than single particle excitations in atomic ensembles. It provides entanglement connection using simple linear optical operations, and it is inherently robust against the realistic imperfections. Here, "entanglement connection" means that two objects are connected through entangled systems. Consider the system of FIG. 2 (described in more detail below) having two separate entangled bipartite systems. That is to say, the two pairs (L, I1) and (R, I2) where the subsystem L is entangled with subsystem I1 and subsystem R is entangled with subsystem I2. There is a way to create an entangled state between the two subsystems L and R. Such a process is generally called "entanglement connection." A simple example of entanglement connection is called "entanglement swapping." Entanglement swapping is accomplished by performing a so-called Bell-measurement between the two other systems I1 and I2. A successful Bell-measurement connects the two subsystems L and R into an entangled state. In linear optics, it is often the case that a Bell-measurement can be successfully performed only probabilistically. A method to implement such a probabilistic Bell-measurement with linear optics and single-photon detectors of finite efficiency is shown in FIG. 2 and discussed below.

Quantum communication protocols of the present invention include quantum teleportation, cryptography, and Bell inequality detection. "Perfect entanglement" means that interacting physical systems are fully correlated. Increasing communication length in embodiments of the present invention only increases overhead in the communication time polynomially.

An example embodiment of the present invention is implemented with only linear optical components such as beamsplitters, and imperfect single-photon detectors. Yet, it allows intrinsic fault-tolerance. The invention is probabilistic. Many of the sources of errors do not affect the resulting state, even though they affect the probability of success. Some of the errors only affect the coefficients of the successful state. Such modified coefficients can be easily compensated for or taken into account by system design without affecting polynomial scaling. Thus, one advantage of the present invention is that it allows for of long-distance quantum communication or entanglement with resources that only scale polynomially with the communication distance.

The present invention also provides stable local information carriers, i.e., stable quantum memory, due to the stability of collective excitations, resulting in relatively long decoherence times. In addition, relatively large cross sections exist between certain photons and certain collective excitations that provide a substantial probability of collective excitation generation per incident photon. These probabilities can be as great as approaching 1, preferably at least 0.5, and less preferably 0.25 or 0.1.

The inventors recognized that the light source may excite a number of other optical modes besides the desirable collective mode discussed below. The effects of the other optical modes can be computed by standard perturbation theory in quantum mechanics. Therefore, it is simplest to understand the present invention by focusing on the desirable collective mode only. For this reason, a one-dimensional light propagation model and only the desirable collective mode are discussed herein below, and all other optical modes are ignored. However, the invention applies to more general configurations and is operable in the presence of other optical modes.

BRIEF DESCRIPTION OF THE FIGURES

Embodiments of the invention are described below in conjunction with the following Figures, in which like or corresponding elements are given the same reference number.

DESCRIPTION OF THE PREFERRED EMBODIMENTS

In some formulas below, the "proportional to" sign "~" is replaced by a box symbol, such as "quadrature," which also means "proportional to."

Figure 1:
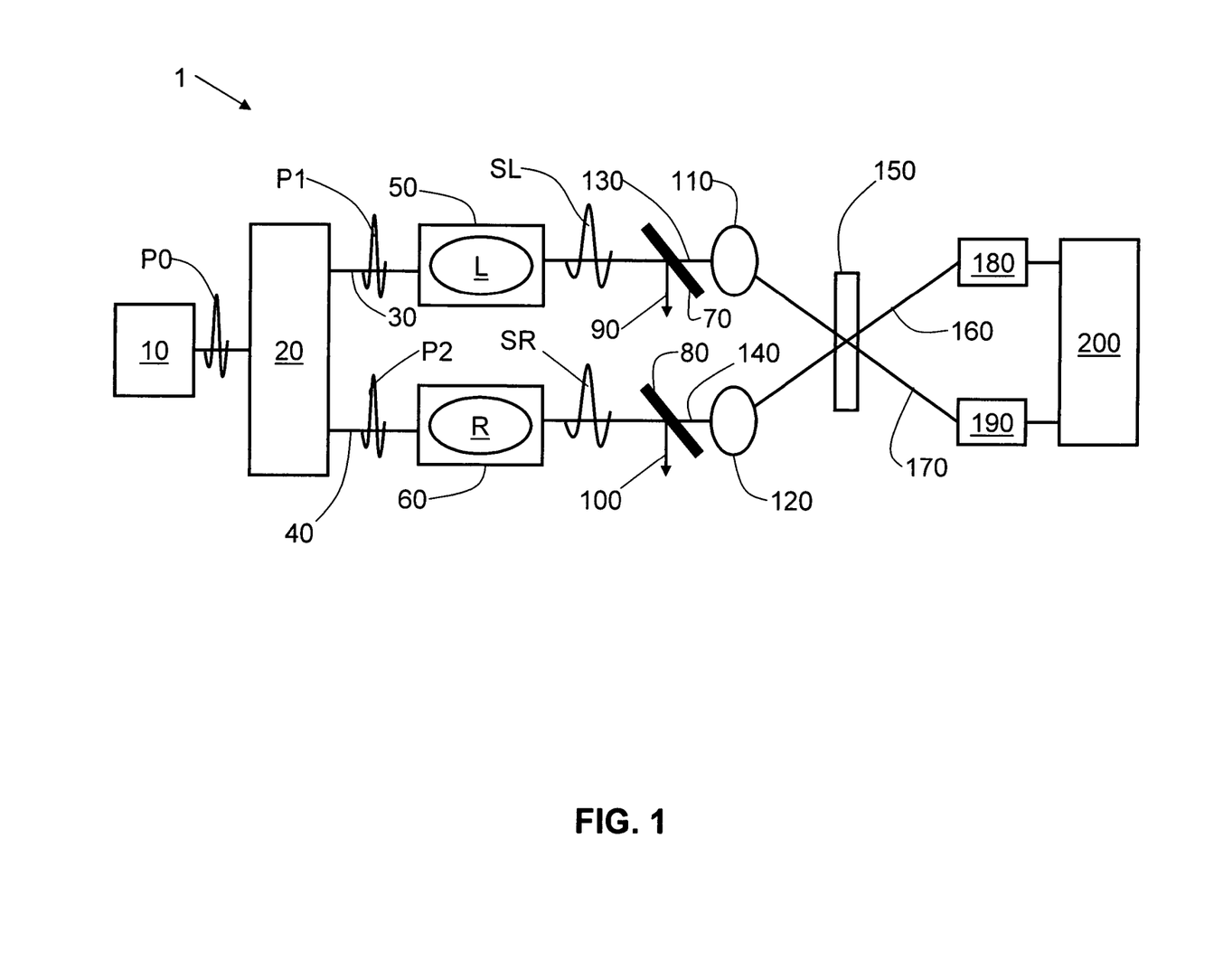
FIG. 1 is a schematic diagram of an example embodiment of an apparatus according to the present invention that is used to create entanglement between two atomic ensembles.

FIG. 1 is a schematic diagram of an example embodiment of an apparatus 1 according to the present invention. Apparatus 1 includes a light source 10. Light source 10 may include a pulser or amplitude modulator to convert continuous light to pulsed light. Source 10 may also include electronics for synchronizing laser pulses. Light source 10 emits either continuous light or pulses of light. In an example embodiment, light source 10 is laser.

Apparatus 1 also includes a light pulse synchronizer 20 optically coupled to light source 10 and from which emanates light beams (pulses) P1 and P2 along optical paths 30 and 40. Synchronizer 20 is adapted to receive light P0 from light source 10 and generate synchronized output beams (e.g., synchronized output pulses P1 and P2) along optical paths 30 and 40. Apparatus 1 also includes two atomic ensemble cells 50 and 60 containing atomic ensembles L, R, respectively. Cells 50 and 60 are arranged along optical paths 30 and 40, respectively, so as to receive synchronized light pulses P1 and P2 from the synchronizer. In an example embodiment, atomic ensembles L and R emit Stokes light pulses SL and SR in response to being irradiated by the synchronized laser pulses. In an example embodiment, each cell contains an alkali gas sample containing about $10^{12}$ atoms of an alkali element. The cells may be, for example, glass cells with an interior antireflection coating. To facilitate enhanced coupling to optical pulses P1 and P2, the atomic ensembles are preferably optically thick along the direction of light propagation. This is achieved, for example, by providing a pencil-shaped cell. As mentioned above, the term "atomic ensemble" is not limited to atoms per se, and the phrase as used herein is to be construed broadly to include other forms of matter capable of supporting a collective excitation and emitting Stokes light pulses, such as molecules, ensembles of localized excitation states such as electron states in superlattice structures including quantum dot ensembles, Bose-Einstein condensates, and the like.

Apparatus 1 also includes filters 70 and 80 arranged downstream of and optically coupled to cells 50 and 60, respectively. Filters 70 and 80 are structured to select (i.e., transmit) a specified polarization and frequency corresponding to Stokes light pulses SL and SR emanating from cells 50 and 60, respectively, and to reject (i.e., reflect) all other light along optical paths 90 and 100, respectively.

Further included in apparatus 1 are transmission channels 110 and 120 arranged downstream of and optically coupled to filters 70 and 80 via optical paths 130 and 140, respectively. In an example embodiment, transmission channels 110 and 120 are structures, such as optical fibers, through which propagate Stokes pulses SL and SR transmitted by filters 70 and 80.

Apparatus 1 further includes a beamsplitter 150 arranged at the intersection of transmission channels 110 and 120. Beam splitter 150 is preferably a mirror that provides 50% incident intensity reflection and transmission. In alternative embodiments, beam splitter 150 is or includes a 50:50 fiber coupler. Light exiting beamsplitter 150 can travel along two optical paths 160 and 170. Generally, beam splitter 150 is adapted to interfere the Stokes light pulses SL and SR from channels 110 and 120 with a 50:50 ratio. That is, the beam splitter serves as an "interferer" because it provides for interference of the two Stokes light pulses.

Apparatus 1 also includes single-photon detectors (SPDs) 180 and 190, which in an example embodiment are conventional SPDs capable of receiving and detecting light propagated along respective optical paths 160 and 170 from beam splitter 150.

Additional elements of apparatus 1 include a photodetector control system 200 operably coupled to SPDs 180 and 190. Photodetector control system 200 includes, for example, electronics for controlling the operation of the SPDs. Apparatus 1 also includes electronics (not shown), such as a controller, for controlling the operation of light source 10 and/or synchronizer 20 for synchronizing laser pulses P1 and P2 delivered to cells 50 and 60.

In operation, light source 10 generates synchronized laser pulses P0 and synchronizer 20 creates therefrom synchronized light pulses P1 and P2 that propagate along optical paths 30 and 40 and into atomic ensembles L and R contained in cells 50 and 60. Stokes light pulses SL an SR are emitted from the atomic ensembles L and R in cells 50 and 60 in response to being irradiated by synchronized laser pulses P1 and P2. For the generation of entanglement using Stokes light pulses generated in the cells, light source 10 must operate at the wavelength that matches the transition frequency of the atomic ensembles in each cell. Light sources 10 capable of matching the transition frequency of the atomic ensembles contained in cells 50 and 60 include certain coherent and partially coherent sources, such as certain lasers, including solid state, semiconductor, dye, free electron, and gas lasers.

As mentioned above, in an example embodiment, light source 10 is laser. More particularly, in an example embodiment, light source 10 is a diode laser emitting pulses P0 at a wavelength of 852 nm with a pulse duration of 0.1 microsecond and a repetition rate of at least 1 MHz. This wavelength matches the absorption energy of Cesium atom ensembles, at approximately room temperature, of 852 nm. "Approximately room temperature" in this context means temperatures between about 20 and about 30 Celsius. Preferably, each cell 50 and 60 contains approximately N identical alkali atoms.

Preferably, the atomic ensembles L and R in cells 50 and 60, respectively, comprise atoms having a Lambda-level structure. For instance, an example atomic ensemble includes Rubidium atoms in vapor form at around 70 to 90 degree Celsius, with atomic densities of about $10^{11}$ to $10^{12}$ per cubic centimeter, used in combination with a light source 10 in the form of a diode laser with a frequency close to the atomic level transition frequency for Rubidium. In one example embodiment, the alkali atom ensembles are at low temperature. For instance, in one embodiment, approximately 11 million sodium atoms are cooled to about 0.9 micro-Kelvin, just above the critical temperature for Bose-Einstein condensation. The cell defines the atomic ensemble to have a length of about 350 microns in the longitudinal direction as traveled by the light and about 55 microns in the transverse directions, and a peak atomic density of about 11 atoms per cubic micron. Generally, atomic densities in the range of 1 to 100 atoms per cubic centimeter can be used.

A desirable longitudinal dimension for cells 50 and 60 on the order of 3 cm. However, if a larger dimension is employed, the overall decoupling strength between the source signal and the atom ensemble is increased. Depending on the identity and density of the medium making up the atomic ensembles, in some applications, a larger cell dimension may be desirable.

The relevant level structure of the atomic ensembles contains $|g\rangle$ the ground state, $|s\rangle$, the metastable state for storing a qubit, and $|e\rangle$, the excited state. The transition $|g\rangle \rightarrow |e\rangle$ is coupled by the classical laser with the Rabi frequency, and the forward scattering Stokes light comes from the transition $|e\rangle \rightarrow |s\rangle$. An off-resonant coupling with a large detuning $\Delta$ is assumed. The two atomic ensembles L and R are pencil shaped and illuminated by the synchronized classical laser pulses P1 and P2. The forward-scattering Stokes pulses 130 and 140 are transmitted through polarization and frequency selective filters 70 and 80, propagate through channels 110 and 120 and interfere at 50:50 beam splitter 150. Finally, single photons propagating through beam splitter 150 are detected in SPDs 180 and 190. If there is a click in either SPD 180 or 190, the process is finished and the entanglement is generated between the atomic ensembles L and R. Otherwise, a repumping pulse is first applied to the transition $|s\rangle \rightarrow |e\rangle$ on the ensembles L and R to set the state of the ensembles back to the ground state $$|0\rangle_a^L \hat{x} |0\rangle_a^{Ra},$$

then the same classical laser pulses as in the first round are applied to the transition $|g\rangle \rightarrow |e\rangle$ and the forward-scattering Stokes pulses are generated. This process is repeated until finally there is a click in either SPD 180 or 190.

A pair of metastable lower states $|g\rangle$ and $|s\rangle$ corresponds e.g., to hyperfine or Zeeman sublevels of electronic ground state of alkali atoms. All the atoms are initially prepared in the ground state $|g\rangle$. A sample is illuminated by a short, off-resonant laser pulse that induces Raman transitions into the states $|s\rangle$. The forward-scattered Stokes light that is co-propagating with the laser is uniquely correlated with the excitation of the symmetric collective atomic mode S given by $$S = (1/\sqrt{N_a}) \Sigma_i |g\rangle_i \langle s|,$$

where the summation is taken over all the atoms (or molecules, etc.) in the atomic ensemble. In particular, an emission of the single Stokes photon in a forward direction results in the state of atomic ensemble given by $$S^\dagger |0_a\rangle$$

where the ensemble ground state is given by $$|0\rangle_a = \hat{x}_i |g\rangle_i.$$

The light-atom interaction time $t_\Delta$ is short enough so that the mean photon number in the forward scattered Stokes pulse is much smaller than 1. An effective single-mode bosonic operator a can be defined for this Stokes pulse with the corresponding vacuum state denoted by $|0\rangle_p$. The whole state of the atomic collective mode and the forward-scattering Stokes mode is written in the following form:

$$|\phi\rangle = |0\rangle_a |0\rangle_p + \sqrt{p_c} S^\dagger a^\dagger |0\rangle_a |0\rangle_p + o(p_c) \quad (1)$$

where $p_c$ is the small excitation probability and $o(p_c)$ represents the terms with more excitations whose probabilities are equal or smaller than $p^2_c$. A fraction of light is emitted in other directions due to the spontaneous emissions. However, whenever $N_a$ is large, the contribution to the population in the symmetric collective mode from the spontaneous emissions is small. As a result there is a large signal-to-noise ratio for the processes involving the collective mode, which greatly enhances the efficiency of the present methods.

The methods of the present invention generate entanglement between two distant atomic ensembles L and R using apparatus 1 of FIG. 1. Two laser pulses excite both atomic ensembles L and R simultaneously and the whole system is described by the state $$|\phi\rangle_L \otimes |\phi\rangle_R, \text{ where } |\phi\rangle_L \text{ and } |\phi\rangle_R$$

are given by Equation (1) with all the operators and states distinguished by the subscript L or R. The forward scattered Stokes light (i.e., Stokes pulses 130 and 140) from both ensembles is combined at beam splitter 150 and a click in either SPD 180 or 190 measures the combined radiation from two samples, $$a_+^\dagger a_+ \text{ or } a_-^\dagger a_- \text{ with}$$

$$a_\pm = (a_L \pm e^{i\phi} a_R)/\sqrt{2}$$

Here, $\phi$ denotes an unknown difference of the phase shifts in the two-side channels 110 and 120. The variable $\phi$ has an imaginary part to account for the possible asymmetry of the setup, which is corrected automatically. The asymmetry can be easily made very small, and $\phi$ is assumed real in the following. Conditional on the detector click, $a_+$ or $a_-$ are applied to the whole state $$|\phi\rangle_L \otimes |\phi\rangle_R.$$

This provides the projected state of the atomic ensembles L and R being nearly maximally entangled with the form (neglecting the high-order terms $o(p_c)$):

$$|\Psi_\phi\rangle_{LR}^\pm = (S_L^\dagger \pm e^{i\phi} S_R^\dagger)/\sqrt{2}|0_a\rangle_L|0_a\rangle_R. \quad (2)$$

The probability for getting a click is given by $p_c$ for each round, so the process must be repeated about $1/p_c$ times for a successful entanglement preparation, and the average preparation time is given by $$T_0 \sim t_\Delta/p_c.$$

The states $$|\Psi_\phi\rangle_{LR}^+ \text{ and}$$

$$|\Psi_\phi\rangle_{LR}^-$$

are easily transformed to each other by a local phase shift. Without loss of generality, it is assumed in the following that the entangled state $$|\Psi_\phi\rangle_{LR}^+$$

is generated.

The presence of the noise modifies the projected state of the ensembles to $$\rho_{LR}(c_0, \varphi) = \frac{1}{c_0 + 1}(c_0|0_a 0_a\rangle_{LR}\langle 0_a 0_a| + |\Psi_\varphi\rangle_{LR}^+\langle\Psi_\varphi|), \quad (3)$$

where the "vacuum" coefficient $c_0$ is determined by the dark count rates of the photon detectors. It will be seen below that any state in the form of Equation (3) will be purified automatically to a maximally entangled state in the entanglement-based communication schemes. Therefore, this state is called an "effective maximally entangled" (EME) state with the vacuum coefficient $c_0$ determining the purification efficiency.

Each step of the process of entanglement generation and corresponding applications contains built-in entanglement purification, which makes the method resilient to realistic noise and imperfections. In entanglement generation, the dominant noise is photon loss noise, which includes the contributions from the channel attenuation, the spontaneous emissions in the atomic ensembles (which results in the population of the collective atomic mode with the accompanying photon going to other directions), the coupling inefficiency of the Stokes light into and out of the channels, and the inefficiency of the SPDs. The loss probability is denoted by $1-\eta_p$ with the overall efficiency $$\eta_p = \eta_p' e^{-L_0/L_{att}}$$

where the channel attenuation $$e^{-L_0/L_{att}}$$

is separated from other noise contributions $\eta_p'$ with $\eta_p'$ independent of the communication distance $L_0$ ($L_{att}$ is the channel attenuation length). The photon loss decreases the success probability for getting a detector click from $p_c$ to $\eta_p p_c$, but it has no influence on the resulting EME state. In this sense, the entanglement purification process is built-in and the process is intrinsically fault-tolerant. Due to this noise, the entanglement preparation time is replaced by $$T_0 \sim t_\Delta/(\eta_p p_c).$$

In non-technical terms, many types of errors are in some sense, "self-correcting" in the process. Note that the method of the invention is probabilistic in that it depends on the occurrence of a pulse being detected, where each outcome of an event is known to be either a "success" or a "failure," e.g., by the existence or non-existence of a pulse detection. Errors that are self-correcting affect the probability of success and the coefficients of the resulting states, but they do not, a priori, lead to a corrupted state, when the protocol indicates a "success" in the process. The change in coefficients in the process due to errors can be either pre-computed or observed in a real experiment. Therefore, those effects can be compensated or accounted for without affecting the main spirit of the protocol, e.g., the ability to communicate. The built-in nature of entanglement purification and, thus, the intrinsic fault-tolerant nature of the entanglement purification process is discussed in more detail below. In summary, the present invention has built-in entanglement purification and is intrinsically fault-tolerant.

The second source of noise comes from the dark counts of SPDs 180 and 190. The dark count gives a detector click, but without population of the collective atomic mode, so it contributes to the vacuum coefficient in the EME state. If the dark count comes up with a probability $p_{dc}$ for the time interval $t_\Delta$, the vacuum coefficient is given by $$c_0 = p_{dc}/(\eta_p p_c),$$

which is typically much smaller than 1 because the Raman transition rate is much larger than the dark count rate.

The final source of noise, which influences the fidelity to get the EME state, is caused by an event in which more than one atom is excited to the collective mode S whereas there is only one click in either SPD 180 or 190. The conditional probability for that event is given by $p_c$, so we can estimate the fidelity imperfection $\Delta F_0 \equiv 1-F_0$ for the entanglement generation by $$\Delta F_0 \sim p_c \quad (4)$$

By decreasing the excitation probability $p_c$, it is possible to make the fidelity imperfection closer and closer to zero with the price of a longer entanglement preparation time $T_0$. This is the basic idea of the entanglement purification. In this scheme, the confirmation of the click from the single-photon detector generates and purifies entanglement at the same time.

In entanglement swapping, the dominant noise is loss, such as associated with SPD inefficiency, the inefficiency of the excitation transfer from the collective atomic mode to the optical mode, and the small decay of the atomic excitation during the storage. By introducing the detector inefficiency, the imperfection is automatically taken into account by the fact that SPDs 180 and 190 cannot distinguish between a single photon and two photons. The overall efficiency in the entanglement swapping is denoted by $\eta_s$. The loss in the entanglement swapping gives contributions to the vacuum coefficient in the connected EME state, since in the presence of loss a single detector click might result from two collective excitations in the ensembles $I_1$ and $I_2$, and in this case, the collective modes in the atomic ensembles L and R have to be in a vacuum state. After taking into account the realistic noise, it is possible to specify the success probability and the new vacuum coefficient for the $i^{th}$ entanglement connection by the recursion relations $$p_1 \equiv f_1(c_{i-1}) = \eta_s \left(1 - \frac{\eta_s}{2(c_{i-1}+1)}\right) \Big/ (c_{i-1}+1)$$

and $c_i \equiv f_2(c_{i-1}) = 2c_{i-1}+2-\eta_s$. The coefficient $c_0$ for the entanglement preparation is typically much smaller than $1-\eta_s$, $$c_i \approx (2^i-1)(1-\eta_s) = (L_i/L_0-1)(1\eta_s),$$

where $L_i$ denotes the communication distance after i times entanglement connection. With the expression for the $c_1$, the probability $p_i$ and the communication time $T_n$ are evaluated for establishing an EME state over the distance $L_n=2^n L_0$. After the entanglement connection, the fidelity of the EME state also decreases, and after n times connection, the overall fidelity imperfection is given by:

$$\Delta F_n \sim 2^n \Delta F_0 \sim (L_n/L_0) \Delta F_0.$$

$\Delta F_n$ must be fixed to be small by decreasing the excitation probability $p_c$ in Equation (4).

The entanglement connection scheme also has built-in entanglement purification function. This can be understood as follows: Each time entanglement is connected, the imperfections of the setup decrease the entanglement fraction $1/(c_i+1)$ in the EME state. However, the entanglement fraction decays only linearly with the distance (the number of segments), which is in contrast to the exponential decay of the entanglement for the connection schemes without entanglement purification. The reason for the slow decay is that in each time of the entanglement connection, the protocol must be repeated until there is a detector click, and the confirmation of a click removes part of the added vacuum noise since a larger vacuum component in the EME state results in more repetitions. The built-in entanglement purification in the connection scheme is essential for the polynomial scaling law of the communication efficiency.

Entanglement-based applications of the invention, such as long-distance quantum communication systems, also have built-in entanglement purification which makes them resilient to realistic sources of noise. Firstly, the vacuum components in the EME states are removed from the confirmation of the detector clicks and thus have no influence on the fidelity of all the application schemes. Secondly, if the SPDs and the atom-to-light excitation transitions in the application schemes are imperfect with the overall efficiency, then these imperfections only influence the efficiency to get the detector clicks with the success probability replaced by $$p_a = \eta_a / [2(c_n+1)^2],$$

and have no effect on the communication fidelity. Finally, the phase shifts in the stationary channels and the small asymmetry of the stationary setup are removed automatically when the EME state is projected onto the PME state, and thus have no influence on the communication fidelity. The noise not correctable by this method includes the detector dark count in the entanglement connection and the non-stationary channel noise and set asymmetries. The resulting fidelity imperfection from the dark count increases linearly with the number of segments $L_n/L_0$, and form the non-stationary channel noise and set asymmetries increases by the random-walk law $(L_n/L_0)^{1/2}$. For each time of entanglement connection, the dark count probability is about $10^{-5}$ if a typical choice is made that the collective emission rate is about 10 MHz and the dark count rate is $10^2$ Hz. This noise is negligible even if for communications over a long distance. The non-stationary channel noise and setup asymmetries can also be safely neglected for such a distance. For instance, it is relatively easy to control the non-stationary asymmetries in local laser operations to values below $10^{-4}$ with the use of accurate polarization techniques for Zeeman sublevels.

Each entanglement generation and connection method of the present invention has built-in entanglement purification. As a result of this property, the communication fidelity can be fixed to be nearly perfect, and the time for preparing the system for communication increases only polynomially with the operating distance over which communication takes place. To communicate over a distance $L=L_n=2^n L_0$, the overall fidelity imperfection must be fixed to be a desired small value $\Delta F_n$, in which case the entanglement preparation time is $$T_0 \sim t_\Delta/(\eta_p \Delta F_0) \sim (L_n/L_0) t_\Delta/(\eta_p \Delta F_n).$$

For an effective generation of the PME state, the total communication time $$T_{tot} \sim T_n/p_a$$

with $$T_n \sim T_0 \Pi_{i=1}^n (1/p_i).$$

The total communication time scales with the distance by the law $$T_{tot} \sim 2(L/L_0)^2/(\eta_p \eta_a \Delta F_T \Pi_{i=1}^n p_i) \quad (5)$$

where the success probabilities $p_i$, $p_a$ for the $i^{th}$ entanglement connection and for the entanglement application have been specified before. The expression (5) confirms that the communication time $T_{tot}$ increases with the distance L only polynomially. In the first limiting case, the inefficiency $1-\eta_s$ or the entanglement swapping is assumed to be negligibly small. It is deduced from Equation (5) that in this case the communication time $T_{tot} \sim T_{con}(L/L_0)^2 e^{L_0/L_{att}}$, with the constant $$T_{con} = 2t_\Delta / (\eta_p \eta_a \Delta F_T)$$

being independent of the segment and the total distances $L_0$ and $L$. The communication time $T_{tot}$ increases with $L$ quadratically. In the second case, it is assumed that the inefficiency $1-\eta_s$ is considerably large. The communication time in this case is approximated by $$T_{tot} \sim T_{con}(L/L_0)^{[\log 2(L/L_0)+1]/2 + \log 2(1/\eta_s - 1) + 2} e^{L_0/L_{att}},$$

which increases with $L$ still polynomially (or sub-exponentially in a more accurate language, but this makes no difference in practice since the factor $\log_2(L/L_0)$ is well bounded from above for any reasonably long distance). If $T_{tot}$ increases with $L/L_0$ by the $m_{th}$ power law $(L/L_0)^m$, there is an optimal choice of the segment length to be $L_0 = mL_{att}$ to minimize the time $T_{tot}$. As an estimation of the improvement in the communication efficiency, it is assumed that the total distance $L$ is about $100L_{att}$, for a choice of the parameter $\eta_s \approx 2/3$, the communication time $T_{tot}/T_{con} \sim 10^6$ with the optimal segment length $L_0 \sim 5.7L_{att}$. This result is a dramatic improvement compared with the direct communication case, where the communication time $T_{tot}$ for getting a PME state increases with the distance $L$ by the exponential law $$T_{tot} \sim T_{con} e^{L/L_{att}}.$$

For the same distance $L_0 \sim 100L_{att}$, one needs $T_{tot}/T_{con} \sim 10^{43}$ for direct communication, which means that for this example the present scheme is $10^{37}$ times more efficient.

FIG. 2 is a schematic diagram of a quantum repeater apparatus 201 similar to that of FIG. 1, but that includes two pairs of atomic ensembles. Apparatus 201 includes source 10 and synchronizer 20. Apparatus 201 also includes a first pair of optically coupled cells 230 and 241 that contain respective atomic ensembles I1 and L, and a second pair of optically coupled cells 231 and 242 that contain respective atomic ensembles I2 and R. Cells 230 and 231 are arranged downstream of and are optically coupled to synchronizer 20 via respective optical paths 250 and 251. Filters 260 and 261 are arranged downstream of respective cells 230 and 231 and serve the same purpose as filters 70 and 80 in apparatus 1 of FIG. 1. Likewise, a beam splitter 270 is arranged at the intersection of optical paths 254 and 255 that are followed by Stokes pulses SI2 and SI1 that emanate from cells 231 and 230. Optical paths 254 and 255 optically couple filters 261 and 260 to respective SPDs 280 and 281. A photodetector control system 290 is coupled to SPDs 280 and 281 controls the operation of the SPDs.

In the operation of apparatus 201, light pulses P0 emitted by source 10 pass through synchronizer 20, which creates synchronized light pulses P1 and P2 that traverse paths 250 and 251 to atomic ensembles I1 and I2 contained in respective cells 230 and 231. In atomic ensembles I1 and I2, the photons in the light pulse incident on the atomic ensembles either undergo a collective stokes scattering from the atoms of the ensemble, or they do not. If they do not, they are reflected by filters 260 and 261 along optical paths 252 and 253. On the other had, if the photons are Stokes scattered, they are converted to a different frequency (and/or k vector) and are transmitted by filters 260 and 261 along optical paths 254 and 255 as Stokes pulses SI1 and SI2. The Stokes pulses (photons) then interfere at beam splitter 270. SPDs 280 and 281 receive photons propagating along respective optical paths 254 and 255, and each SPD generates a detection signal ("click") when it detects a photon. Photodetector control system 290 receives detection signals S280 and S281 from SPDs 280 and 281 and processes these signals.

Each of the atomic ensemble-pairs, i.e., pair L and I1 and pair I2 and R, is prepared in an EME state in the form of Equation (3). The excitations in the collective modes of atomic ensembles I1 and I2 are transferred simultaneously to the optical excitations by the repumping pulses applied to the atomic transition $|s\rangle \rightarrow |e\rangle$. The stimulated optical excitations, after a 50%-50% beam splitter, are detected by the SPDs 180 and 190. If either SPD 180 or 190 generates a click, the protocol is successful and an EME state is established between atomic ensembles L and R, thereby doubling the effective communication distance. If no SPD generates a click, the previous entanglement generation and swapping process is repeated until a click is generated by SPD 180 or 190, that is, until the protocol succeeds.

In an example embodiment of apparatus 201, the two intermediated atomic ensembles I1 and I2 are replaced by one ensemble having two metastable states to store two different collective modes. The beam splitter 270 operation is replaced by its functional equivalent, a so-called $\pi/2$ pulse. In the language of quantum field theory, let the collective modes be described by the two collective mode annihilation operators, $a_1$ and $a_2$. Such a $\pi/2$ pulse maps $a_1$ and $a_2$ into their linear combinations in the following manner:

$$a_1 \text{ into } (a_1 + ia_2)/\sqrt{2} \text{ and } a_2 \text{ into } (a_1 - ia_2)/\sqrt{2} \qquad \text{Eq. (A)}.$$

Physically, such a $\pi/2$ pulse may be implemented by an external laser (not shown in FIG. 2) that emits a pulse onto the ensemble containing the two said metastable states. The ensemble absorbs the $\pi/2$ laser pulse and changes its own state according to the transformation of the two said collective mode annihilation operators described by Eq. (A).

The embodiment in FIG. 2 provides two pairs of the entangled ensembles described by the state $$\rho_{LI_1} \otimes \rho_{I_2R}, \text{ where}$$

$$\rho_{LI_1} \text{ and } \rho_{I_2R}$$

are given by Equation (3). In the ideal case, the system shown in FIG. 2 measures the quantities corresponding to operators $$S_\pm^\dagger S_\pm \text{ with } S_\pm = (S_{I_1} \pm S_{I_2})/\sqrt{2}$$

If the measurement is successful (i.e., one of the detectors registers one photon), the ensembles L and R are prepared into another EME state.

The new $\phi$-parameter is given by $\phi_1 + \phi_2$, where $\phi_1$ and $\phi_2$ denote the old $\phi$-parameters for the two segment EME states. In the presence of the realistic noise and imperfections, an EME state is still created after a detector click. Noise only influences the success probability to get a click and the new vacuum coefficient in the EME state. In general the success probability $p_1$ is expressed and the new vacuum coefficient $c_1$ and $$p_1 = f_1(c_0) \text{ and}$$

$$c_1 = f_2(c_0),$$

where the functions $f_1$ and $f_2$ depend on the particular noise properties.

The above method for connecting entanglement between atomic ensembles can be cascaded to arbitrarily extend the effective communication distance. For the $i^{th}$ (i=1, 2, ..., n) entanglement connection, two pairs of atomic ensembles are first prepared in parallel in the EME states with the same vacuum coefficient $c_1$ and the same communication length $L_{i-1}$. Entanglement swapping is then performed as described above in connection with FIG. 2. This entanglement swapping attempt succeeds with a probability $p_i = f_1(c_{i-1})$.

After a successful detector click, the communication length is extended to $L_i = 2L_{i-1}$, and the vacuum coefficient in the connected EME state becomes $c_i = f_2(c_{i-1})$.

Since the $i^{th}$ entanglement connection needs to be repeated in average $1/p_i$ times, the total time needed to establish an EME state over the distance $L_n = 2^n L_0$ is given by $T_n = T_0 \Pi_{i=1}^n (1/p_i)$, where $L_0$ denotes the distance of each segment in the entanglement generation.

Entanglement can be attempted at a rate up to the pulse rate of light source 10. Typically available light sources operate up to the megahertz frequencies. In principle, pulse rates in the gigahertz frequencies are attainable, and would result in a sub-nanosecond time $T_0$. Therefore, the average total time needed to establish entanglement in a system of a relatively large number of atomic ensembles using the systems and methods of the present invention can be shorter than a microsecond.

Figure 3:
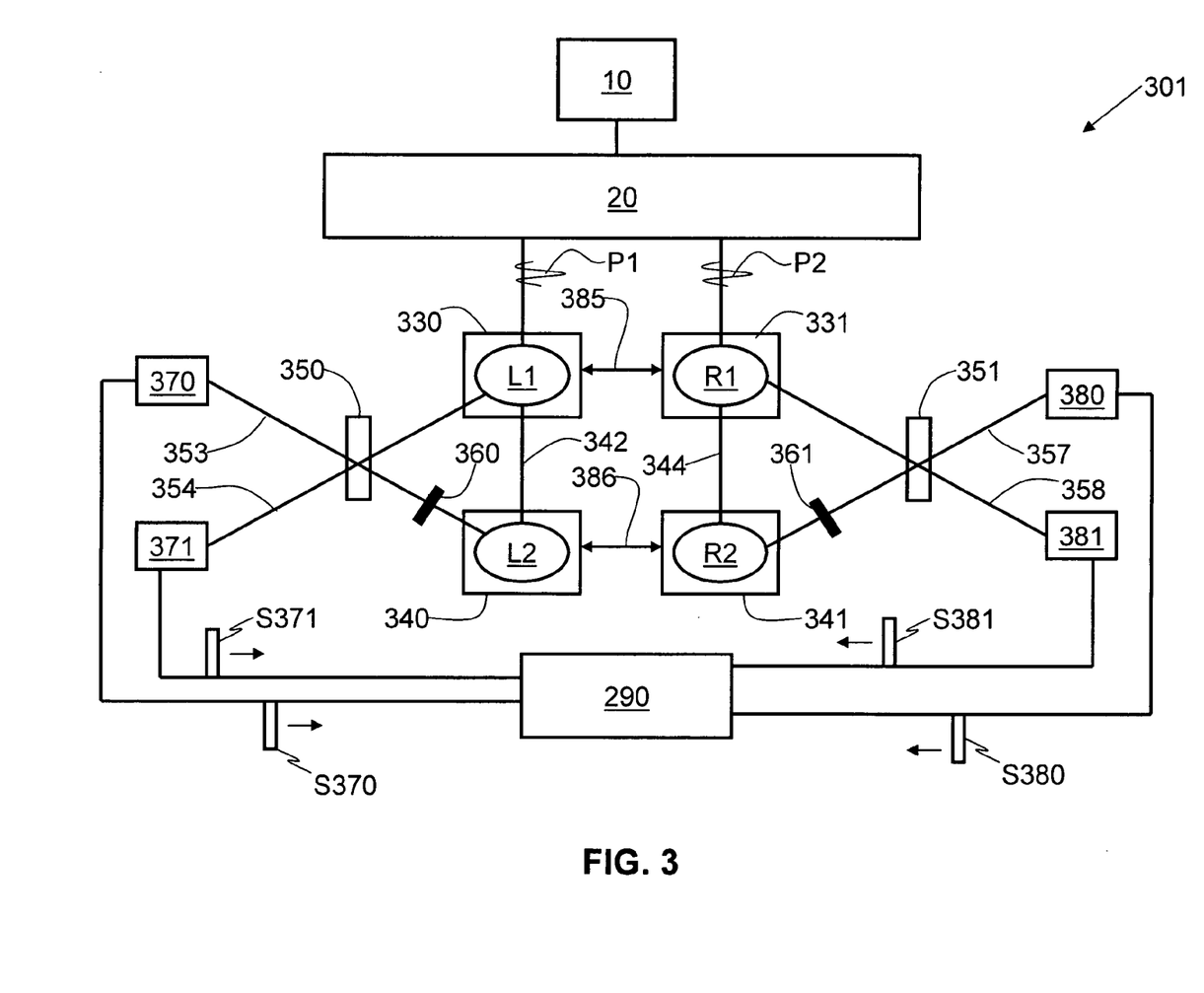
FIG. 3 is a schematic diagram of another example embodiment of an apparatus according to the present invention that employs two pairs of atomic ensembles.

In an example embodiment of the invention, the EME is used in the communication protocols, such as quantum teleportation, cryptography, and Bell inequality detection. FIG. 3 is a schematic diagram of another example embodiment of an entanglement-based apparatus 301 that employs two pairs of atomic ensembles L1 and R1 and L2 and R2. Apparatus 301 can be used, for example, in a QKD system or for testing Bell inequalities. Apparatus 301 includes source 10 and synchronizer 20, as described above, with cells 330 and 331 arranged downstream of and optically coupled to synchronizer 20. Cells 330 and 331 contain atomic ensembles L1 and R1, respectively. Apparatus 301 further includes cells 340 and 341, which respectively contain atomic ensembles L2 and R2, optically coupled to respective cells 300 and 331. Further, cell 330 and 340 are optically coupled via optical path 342, while cells 331 and 341 are optically coupled via optical path 344. A first beam splitter 350 is arranged at the intersection of optical paths 353 and 354 leading from cells 330 and 340 to SPDs 370 and 371, respectively. A second beam splitter 351 is arranged at the intersection of optical paths 357 and 358 leading from cells 331 and 341 to SPDs 380 and 381, respectively. A first phase shifter 360 is arranged in optical path 353 between cell 340 and first beam splitter 350. A second phase shifter 361 is arranged in optical path 357 between cell 341 and second beam splitter 361. Photo detector control system 290 is operably coupled to SPDs 370, 371, 380 and 381.

In apparatus 301, each pair of atomic ensembles—for example, pair (L1,R1)—can be the result of a concatenated application of apparatus 201 of FIG. 2 employing entanglement swapping and entanglement purification, as discussed above. Additional laser sources 10 and synchronization systems 20 may be needed to set up the initial state for atomic ensemble pairs (L1,R1) and also (L2,R2). In apparatus 301 of FIG. 3, it is assumed that the preparation of the initial states of atomic ensemble pairs (L1,R1) and (L2,R2) has already been performed. Formally, the state of the atomic ensemble pair, say (L1, R1), is described as an EME state defined earlier. The arrow 385 indicates that the atomic ensemble pair (L1,R1) has been prepared in an EME state and is quantum mechanically correlated with entanglement. Similarly, the arrow 386 indicates that the atomic ensemble pair (L2,R2) has been prepared an EME state and is quantum mechanically correlated with entanglement.

In FIG. 3, each atomic ensemble pair (L1, R1) may be separated spatially by a very long distance, say 100, 1000, or even 10,000 km. However, atomic ensembles L1 and L2 are supposed to be spatially located much closer than the distance between atomic ensembles L1 and R1. A typical distance between atomic ensembles L1 and L2 may be 10 m or less, although a much longer distance of say one km may also be acceptable. Similarly, atomic ensemble R1 and R2 are supposed to be spatially located much closer than the distance between atomic ensembles L1 and R1. Two pairs of atomic ensembles are needed because a pair of photons is needed for an experiment in quantum key distribution, whereas a pair of atomic ensemble typically generates only a single photon. The beam splitters 350 and 351 allow for entanglement to occur between the two pairs of atomic ensembles, thus generating a maximally entangled state between them.

In an example embodiment, the photodetector control system 290 includes two separate detector/control subsystems (not shown) located near atomic ensemble pairs (L1,L2) and (R1,R2), respectively. The detector/control subsystem located near to atomic ensemble pair (L1,L2) controls the setting of phase shifter 360 and, thus decides the type of measurement to be performed on atomic ensembles (L1,L2). Similarly, the detector/control subsystem located near (R1,R2) controls the setting of phase shifter 361 and decides on the type of measurement to be performed on the atomic ensembles (R1,R2). The output of apparatus 301 is governed by how many and which of the SPDs 370, 371, 380 and 381 have detected a photon.

As shown in FIG. 3, one optical path 342 traverses in sequence atomic ensembles L1 and L2, while another optical path 344 traverses atomic ensembles R1 and R2. Photons generated by the collective excitations in either atomic ensemble L1 or L2 propagate to beam splitter (interferer) 350. The relative angles of optical paths 342 and 344 and the relative angles of optical paths 353, 354 and 357 and 358 are drawn for convenience of illustration. For example, the photons generated by collective excitations in an atomic ensemble may propagate in the same direction as incident photons, and subsequently be diverted by a wavelength-dependent reflector disposed on a far side of the ensemble. Detection at SPD 370 or 371 indicates a collective excitation in atomic ensemble pair (L1,L2), which indicates that atomic ensembles L2 and R2 are entangled with atomic ensembles L1 and R1.

A more detailed and more mathematical description of FIG. 3 is as follows. The pairs of atomic ensembles (L1, R1) and (L2, R2) (or alternatively two pairs of metastable states) are each prepared in EME states. The collective atomic excitations on each side are transferred to the optical excitations, which, respectively after a relative phase shift $\phi_L$ or $\phi_R$, and a 50%-50% beam splitter, are detected by the single-photon detectors $D_1^L, D_2^L$ and $D_1^R, D_2^R$.

There are four possible coincidences of $D_1^L, D_2^L$ with $D_1^R, D_2^R$, which are functions of the phase difference $\phi_L-\phi_R$. Depending on the choice $\phi_L$ and $\phi_R$, this setup can realize both the quantum cryptography and the Bell inequality detection.

It is not obvious that the EME state (3), which is entangled in the Fock basis, is useful for these tasks since in the Fock basis it is experimentally hard to perform certain single-bit operations. EME states can be used to realize all these protocols with simple experimental configurations.

The state of the two pairs of ensembles is expressed as $\rho_{L_1R_1} \otimes \rho_{L_2R_2}$, where $\rho_{L_iR_i}(i=1,2)$ denote the same EME state with the vacuum coefficient $c_n$ if entanglement connection has been done n times. The $\phi$-parameters in $\rho_{L_iR_i}(i=1,2)$ are the same provided that the two states are established over the same stationary channels. Only the coincidences of the two-side detectors are registered, so the protocol is successful only if there is a click on each side. Under this condition, the vacuum components in the EME states, together with the state components $S_{L_1}^\dagger S_{L_2}^\dagger |vac\rangle$ and, $S_{R_1}^\dagger S_{R_2}^\dagger |vac\rangle$, where $|vac\rangle$ denotes the ensemble state $|0_a0_a0_a0_a\rangle_{L_1R_1L_2R_2}$, have no contributions to the experimental results. So, for the measurement apparatus of FIG. 3, the ensemble state $\rho_{L_1R_1} \otimes \rho_{L_2R_2}$ is effectively equivalent to the following "polarization" maximally entangled (PME) state $|\psi\rangle_{PME}=(S_{L_1}^\dagger S_{R_2}^\dagger+S_{L_2}^\dagger S_{R_1}^\dagger)/\sqrt{2}|vac\rangle$ (6)

The success probability for the projection from $\rho_{L_1R_1} \otimes \rho_{L_2R_2}$ to $|\psi\rangle_{PME}$ (i.e., the probability to get a click on each side) is given by $p_a=1/[2(c_n+1)^2]$.

In FIG. 3, the phase shift $\Psi_\Lambda(\Lambda=L$ or $R)$ together with the corresponding beam splitter operation are equivalent to a single-bit rotation in the basis $\{|0\rangle_\Lambda=S_{\Lambda_1}^\dagger|0_a0_a\rangle_{\Lambda_1\Lambda_2}, |1\rangle_\Lambda=S_{\Lambda_2}^\dagger|0_a0_a\rangle_{\Lambda_1\Lambda_2}\}$ with the rotation angle $\theta=\psi_\Lambda/2$. Now, there is the PME state and it is possible to perform the desired single-bit rotations in the corresponding basis, and thus to implement quantum cryptography and Bell inequality detection. For instance, to distribute a quantum key between the two remote sides, we simply choose randomly from the set $\{0, \pi/2\}$ with an equal probability, and keep the measurement results (to be 0 if $D_1^L$ clicks, and 1 if $D_1^R$ clicks) on both sides as the shared secret key if the two sides become aware that they have chosen the same phase shift after the public declare. This is exactly the Ekert scheme and its absolute security is already proven. For the Bell inequality detection, we infer the correlations $E(\psi_L,\psi_R)=P_{D_1^LD_1^R}+P_{D_2^LD_2^R}-P_{D_2^LD_1^R}=\cos(\psi_L-\psi_R)$ from the measurement of the coincidences $P_{D_1^LD_1^R}$, etc.

For the apparatus of FIG. 3, the output is $|E(0,\pi/4)+E(\pi/2,\pi/4)+E(\pi/2,3\pi/4)-E(0,3\pi/4)|=2\sqrt{2}$ whereas for any local hidden variable theories this value should be below 2.

A third method of using the preferred embodiment realizes the setup for probabilistic quantum teleportation of the atomic "polarization" state. Similarly to the second method, two pairs of ensembles $L_1,R_1$ and $L_2,R_2$ are prepared in the EME states. An atomic "polarization" state $(d_0S_{I_1}^\dagger+d_1S_{I_2}^\dagger)|0_a0_a\rangle_{I_1I_2}$ can be teleported with unknown coefficients $d_0$, $d_1$ from the left to the right side, where $S_{I_1}^\dagger$, $S_{I_2}^\dagger$ denote the collective atomic operators for the two ensembles I1 and I2 (or two metastable states in the same ensemble). The collective atomic excitations in the ensembles $I_1,L_1$ and $I_2,L_2$ are transferred to the optical excitations, which, after a 50%-50% beam splitter, are detected by the single-photon detectors $D_1^I,D_1^L$ and $D_2^I,D_2^L$.

If there are a click in $D_1^I$ or $D_1^L$ and a click in $D_2^I$ or $D_2^L$, the protocol is successful. A $\phi$-phase rotation is then performed on the collective mode of the ensemble $R_2$ conditional on that the two clicks appear in the detectors $D_1^L,D_2^L$ or $D_1^R,D_2^R$. The collective excitation in the ensembles $R_1$ and $R_2$, if appearing, would be found in the same "polarization" state $(d_0S_{R_1}^\dagger+d_1S_{R_2}^\dagger)|0_a0_a\rangle_{R_1R_2}$ The established long-distance EME states can be also used for faithful transfer of unknown quantum states through quantum teleportation, with the apparatus of FIG. 4.

Figure 4:
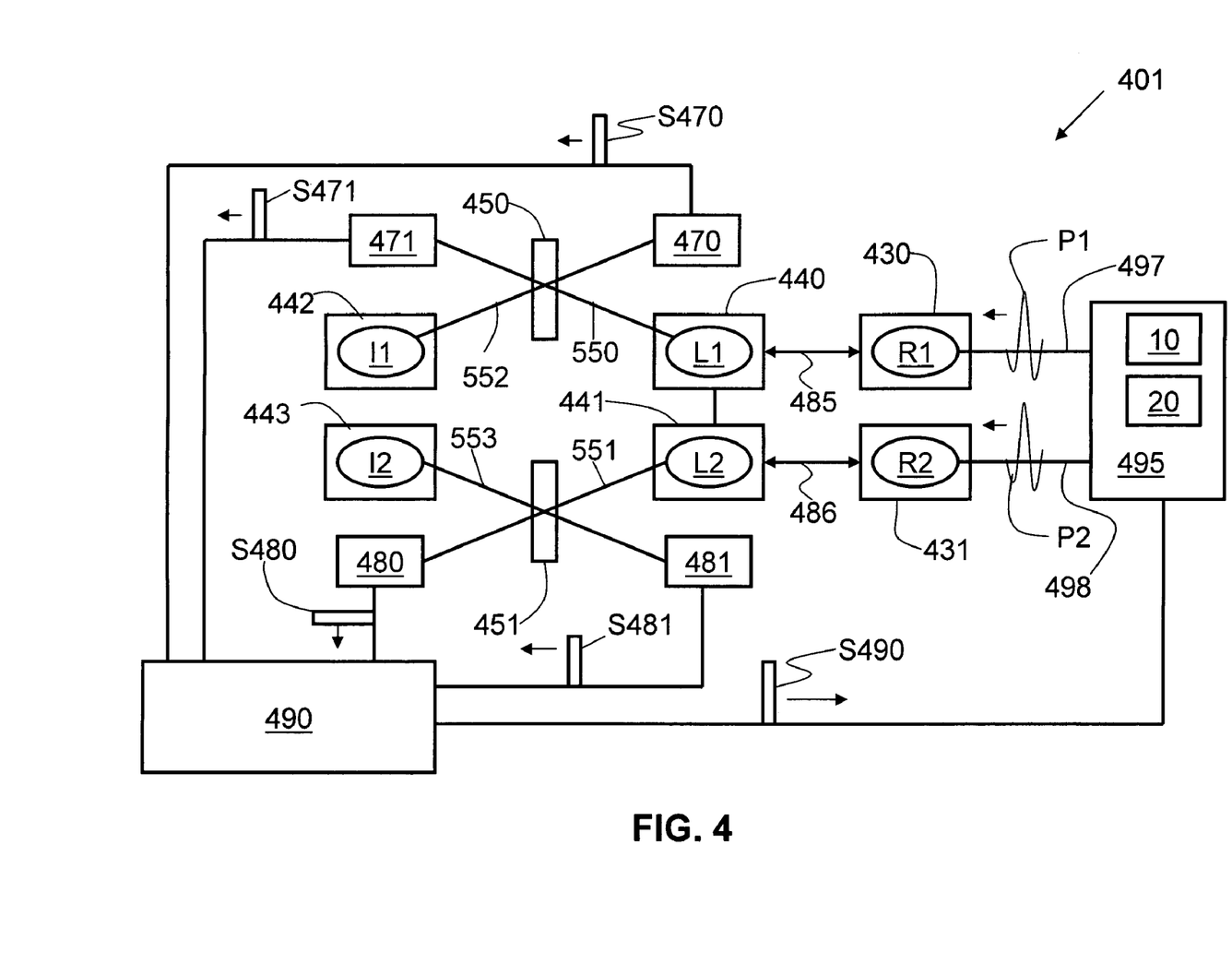
FIG. 4 is a schematic diagram of an apparatus according to the present invention that is adapted for performing probabilistic quantum teleportation of an atomic polarized state.

FIG. 4 is a schematic diagram of another example embodiment of an entanglement-based apparatus 401 according to the present invention that includes two pairs of atomic ensembles (L1, R1) and (L2, R2). Apparatus 401 includes a secondary control system 495 that includes light source 10 and synchronizer 20. Secondary control system 495 is operably coupled to photodetector control system 490 via a communication link 496. Secondary control system 495 is also operably coupled to cells 430 and 431 that contain atomic ensembles R1 and R2, respectively, via respective optical channels 497 and 498. Apparatus 401 also includes cells 440 and 441 that respectively contain atomic ensembles L1 and L2 and that are optically coupled to cells 430 and 431, respectively, as indicated by arrows 485 and 486.

Apparatus 401 further includes cells 442 and 443 that contain respective atomic ensembles I1 and I2. Optical paths 550 and 552 optically couple cells 440 and 442 to a first beam splitter (interferer) 450 and then to SPDs 470 and 471. Likewise optical paths 551 and 553 optically couple cells 441 and 443 to a second beam splitter (interferer) 451 and then to SPDs 480 and 481.

In operation of apparatus 401 of FIG. 4, photodetector control system 490 receives detection signals ("clicks") from SPDs 470 and 471, and 480 and 481. Based upon the received detection signals, photodetector control system 490 sends optical pulse generation control data in the form of signal S490 via communication link 496 to secondary control system 495. Based upon the optical pulse generation control data, secondary control system 495 controls the generation of optical pulses P1 and P2 for transmission to atomic ensemble R1 or atomic ensemble R2. The two-headed arrow denoting optical paths 485 and 486, respectively, indicate that atomic ensembles R1 and L1 are entangled, and that atomic R2 and L2 are entangled.

Apparatus 401 of FIG. 4 can be used for probabilistic quantum teleportation. Consider the atomic ensembles (L1, R1) and (L2,R2). Each atomic ensemble pair—for example, (L1,R1)—can be the result of a concatenated application of apparatus 201 of FIG. 2, which employs entanglement swapping and entanglement purification, as discussed above. Additional laser sources 10 and any synchronization systems 20 may be needed to set up the initial state of atomic ensemble pairs (L1,R1) and also (L2,R2). However, it is assumed that the preparation of the initial states of atomic ensemble pairs (L1,R1) and (L2,R2) has already been performed. Formally, the state of a atomic ensemble pair, say (L1, R1), is described as an EME state defined earlier. The double arrow for optical path 485 indicates that the atomic ensemble pair (L1,R1) has been prepared in an EME state and is, thus, quantum mechanically correlated with entanglement. Similarly, the double arrow for optical path 486 indicates that the atomic ensemble pair (L2,R2) has been prepared an EME state and is thus, quantum mechanically correlated with entanglement.

In apparatus 401, each atomic ensemble pair (L1,R1) may be separated spatially by a very long distance, say 100, 1000, or even 10,000 km. However, atomic ensembles L1 and L2 are supposed to be spatially located much closer than the distance between atomic ensembles L1 and R1. A typical distance between atomic ensembles L1 and L2 may be 10 meters or less, although a much longer distance of say one km may also be acceptable. Similarly, atomic ensembles R1 and R2 are supposed to be spatially located much closer than the distance between atomic ensembles L1 and R1. Note that two pairs of atomic ensembles are needed because the experiment concerns a state of a pair of polarization entangled photons, whereas a pair of atomic ensembles typically gives out only a single photon.

In apparatus 401, the pair of atomic ensembles (I1,I2) is in some unknown quantum state. The goal of apparatus 401 is to teleport this unknown state from atomic ensemble pair (I1,I2) to the remote atomic ensemble pair (R1,R2). Here, atomic ensemble I1 is located spatially close to atomic ensemble L1, and atomic ensemble I2 is spatially close to L2. A typical distance between atomic ensembles I1 and L1 may be 10 meters or less, although a much longer distance of say one km may also be acceptable. The same is true for atomic ensembles I2 and L2. Here, a photodetector control system 490 can be used for controlling SPDs 470, 471, 480 and 481. Effectively, atomic ensemble pair (L1,L2) constitutes a logical qubit (call it qubit A) and atomic ensemble pair (I1,I2) constitutes an unknown input qubit (call it qubit E). In apparatus 401, a probabilistic Bell-measurement is performed on the joint system of qubits (A,E). The atomic ensemble pair (R1,R2) represents a third qubit, qubit B. Photodetector control system 490 obtains the outcome of the probabilistic Bell-measurement and sends it via the communication link 496 via signal S490 to the secondary control system 495. Conditional on the information in the signal it has received, secondary control system 495 may apply one of a number of possible operations on the atomic ensemble R1 and R2 via optical paths 497 and 498 to regenerate the state of teleported qubit (qubit E). In other words, after the re-generation, the state of the qubit B, which is stored in the physical system of the atomic ensemble pair (R1,R2), now becomes the state of the original qubit E. Therefore, the quantum signal has been sent over long distances of 100, 1000 or even 10000 km.

A mathematical and more detailed description of apparatus 401 of FIG. 4 is as follows: In apparatus 401, if two SPDs click on the left side (i.e., SPDs 471 and 480), there is a significant probability that there is no collective excitation on the right side of the apparatus, since the product of the EME states $$\rho_{L_1R_1} \otimes \rho_{L_2R_2}$$

contains vacuum components. However, if there is a collective excitation appearing from the right side, its "polarization" state would be exactly the same as the one input from the left. The teleportation here is probabilistic and needs posterior confirmation; but if it succeeds, the teleportation fidelity would be nearly perfect since in this case the entanglement is equivalently described by the PME state (6). The success probability for the teleportation is also given by $$p_a = 1/[2(c+1)^2],$$

which determines the average number of repetitions for a successful teleportation.

The foregoing describes the theory of the invention and practical applications based upon collective excitation of atomic ensembles, and provides some specific examples of long-distance signal communication systems. However, collective excitations in many types of correlated systems exist, and many of those systems may be found suitable for use as a correlated system of the invention. Thus, while only certain features of the present invention have been outlined and described herein, many modifications and variations will be apparent to those skilled in the art. Therefore, the claims appended hereto are intended to cover all such modifications and equivalents that fall within the broad scope of the invention.

We claim:

1. A method of creating entanglement between first and second atomic ensembles, comprising:

propagating a first pulse of light generated in said pulsed source of light into the first atomic ensemble having a first collective excitation state, wherein photons in said first pulse of light have an energy that can excite the first atomic ensemble to the said first collective excitation state so as to generate first photons;

propagating a second pulse of light generated in said pulsed source of light into the second atomic ensemble having a second collective excitation state, wherein photons in said second pulse of light have an energy that can excite the second atomic ensemble to the second collective excitation state so as to generate second photons;

interfering the first and second photons at an interferer while preventing photons not resulting from the generation of collective excitations in said first atomic ensemble and said second atomic ensemble from reaching said interferer by arranging a first filter in a first optical path between said first atomic ensemble and said interferer, and a second filter in a second optical path between said second atomic ensemble and said interferer;

detecting the interfered photons so as to establish entanglement between the first and second atomic ensembles and;

detecting the interfered photons with a first or second photon detector and controlling said first single photon detector and said second single photon detector with a photo detector controller.

2. The method of claim 1 wherein the first and second light pulses each have a substantial probability of generating collective excitations in the first and second atomic ensembles, respectively.

3. The method of claim 1 including forming each atomic ensemble from one of solid matter, gaseous matter and liquid matter.

4. The method of claim 1 wherein generating the first and second photons involves a Stokes process.

5. The method of claim 1 wherein the first and second atomic ensembles have substantially identical collective excitation energies.

6. The method of claim 1 wherein said first and second atomic ensembles comprise alkali atoms.

7. The method of claim 1 wherein said first and second atomic ensembles comprise Cesium atoms.

8. The method of claim 7 wherein the Cesium atoms in each one of said first and said second atomic ensembles has a density of between 1 and 100 atoms per cubic micron.

9. The method of claim 1 including synchronizing the first and second light pulses with a synchronizer.

10. The method of claim 1 including generating the first and second light pulses with a laser.

11. The method of claim 1 including generating the first and second light pulses with a flash lamp.

12. The method of claim 1 wherein said first ensemble and said second ensemble contain only atoms.

13. The method of claim 1 further comprising ceasing generating first and second light pulses when one of two single photon detectors detects a photon.

14. The method of claim 1 further comprising entangling a third atomic ensemble optically coupled to the first atomic ensemble with a fourth atomic ensemble optically coupled to the second atomic ensemble.

15. The method of claim 14 further comprising entangling said first and second atomic ensembles with said third and fourth atomic ensembles.

16. The method of claim 15 wherein said entangling comprises detecting a photon propagated through a second interferer using a third single photon detector and a fourth single photon detector.

17. The method of claim 16 further comprising filtering light pulses transmitted towards said second interferer.

18. The method of claim 15 further comprising entangling said third and fourth atomic ensembles with fifth and sixth atomic ensembles.

19. The method of claim 1 further comprising repeated applications of the acts defined in claim 1 with a number of additional sets of atomic ensembles to provide long distance quantum communication over a communication distance via entanglement between remote ones of the atomic ensembles in a manner such that that number of additional atomic ensembles scales polynomially with the communication distance.

20. The method of claim 1 further comprising repeated applications of the acts defined in claim 1 with a number of additional sets of atomic ensembles to provide long distance entanglement generation over a communication distance in which the number of atomic ensembles scales polynomially with the communication distance.

* * * * *